(12) United States Patent
Zhang et al.

(10) Patent No.: US 9,394,445 B2
(45) Date of Patent: Jul. 19, 2016

(54) METHOD FOR CONTINUOUSLY PREPARING WATER-SOLUBLE AZO DYE BY COUPLING A NEBULIZER WITH A PIPELINE

(71) Applicant: DALIAN UNIVERSITY OF TECHNOLOGY, Dalian, Liaoning (CN)

(72) Inventors: Shufen Zhang, Liaoning (CN); Bingtao Tang, Liaoning (CN); Rongwen Lv, Liaoning (CN); Dong Liang, Liaoning (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 14/384,070

(22) PCT Filed: Nov. 30, 2012

(86) PCT No.: PCT/CN2012/085622
§ 371 (c)(1),
(2) Date: Sep. 9, 2014

(87) PCT Pub. No.: WO2013/131386
PCT Pub. Date: Sep. 12, 2013

(65) Prior Publication Data
US 2015/0073132 A1 Mar. 12, 2015

(30) Foreign Application Priority Data

Mar. 9, 2012 (CN) .......................... 2012 1 0062250

(51) Int. Cl.
*C09B 41/00* (2006.01)
*C09B 62/44* (2006.01)

(52) U.S. Cl.
CPC ............. *C09B 41/008* (2013.01); *C09B 41/006* (2013.01); *C09B 62/4413* (2013.01)

(58) Field of Classification Search
CPC ........................... C09B 41/008; C09B 41/006
See application file for complete search history.

(56) References Cited

U.S. PATENT DOCUMENTS

| | | | | |
|---|---|---|---|---|
| 3,423,391 | A | * | 1/1969 | Kindler et al. ................. 534/565 |
| 6,548,647 | B2 | * | 4/2003 | Dietz et al. .................... 534/582 |
| 6,562,121 | B2 | | 5/2003 | Nickel et al. |

FOREIGN PATENT DOCUMENTS

| | | | | |
|---|---|---|---|---|
| CN | 101011316 | A | | 8/2007 |
| CN | 200954445 | Y | | 10/2007 |
| CN | 102618083 | A | | 8/2012 |
| DE | 102006004350 | A1 | * | 8/2007 ............... B01J 19/26 |
| WO | 2004072361 | A1 | | 8/2004 |

OTHER PUBLICATIONS

Penth (Machine translation of DE 102006004350 A1 (published Aug. 2, 2007)).*
Kraume et al. (Continuous Mixing of Fluids in Ullmann's Encyclopedia of Industrial Chemistry, vol. 10 (2010) p. 105-134).*
Shao, M.L. et al., "Preparation of Nanosized Alumina Powders by Microreactor of Mist Droplets," Materials for Mechanical Engineering, ISSN 1000-3738, Jan. 2009, vol. 33 No. 1, pp. 44-46, China.

* cited by examiner

*Primary Examiner* — Robert Havlin
(74) *Attorney, Agent, or Firm* — Novick, Kim & Lee, PLLC; Allen Xue

(57) ABSTRACT

Disclosed is a method for continuously preparing a water-soluble azo dye by coupling a nebulizer with a pipeline. According to the method, the nebulizer is coupled with a pipeline with an interception tower plate, atomized and mixed reaction liquid flow flows through the pipeline with the interception tower plate, and mixing and reacting are further enhanced through turbulent mixing on the tower plate, so that instant separation of reaction heat generated in an atomizing contact reaction from a reactant is achieved, and normal-temperature rapid continuous production of the water-soluble azo dye is achieved. Fog drops which are atomized by using the nebulizer have small particle diameter and large specific surface area, so that a diazo salt and a coupling component are sprayed separately, move face to face and can be fully contacted, and mixing and reacting speeds are increased. The preparation method is simple, and compared with preparation of a dye of the same kind with a batch reactor, in the reparation process of the water-soluble azo dye, a cold source is not required to be added additionally for cooling, thereby reducing energy consumption and improving production quality and efficiency.

8 Claims, 1 Drawing Sheet

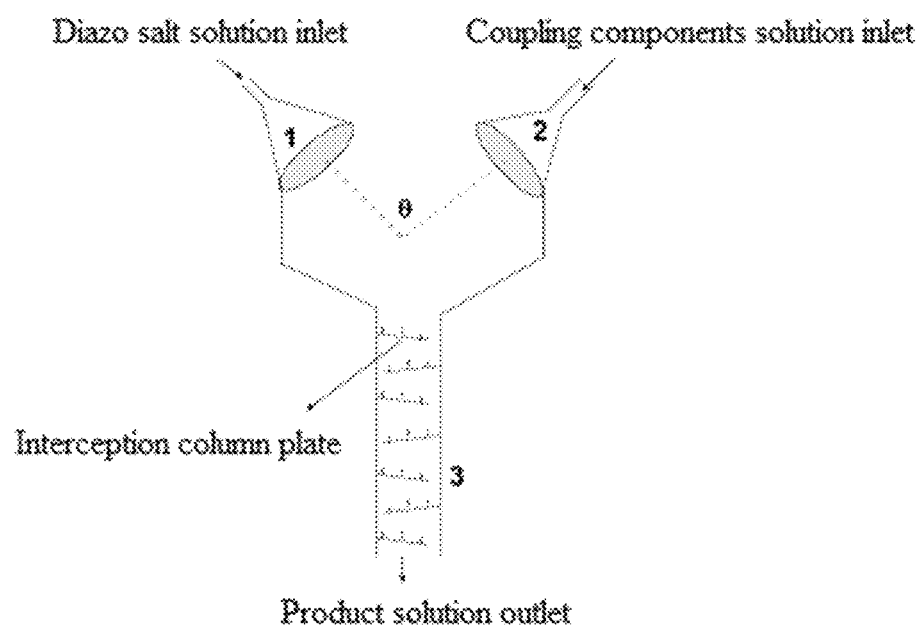

METHOD FOR CONTINUOUSLY PREPARING WATER-SOLUBLE AZO DYE BY COUPLING A NEBULIZER WITH A PIPELINE

FIELD OF THE INVENTION

The present invention relates to a method for continuously preparing water-soluble azo dye by coupling a nebulizer with a pipeline.

BACKGROUND OF THE INVENTION

Azo dyes have wide spectrum range and are synthesized with many categories, are widely used in textile printing and dyeing, printing, paper, cosmetic and other industries. It is a very important category of dyes. The preparation of azo dye mainly consists of diazotization reaction and coupling reaction technology, but the coupling reaction is an exothermic reaction, diazo salt is unstable to heat, so coupling reaction of intermittent technology applied in industry all should be carried out with cooling, usually with ice water bath to cool and the temperature is maintained at 0~5° C. However, in the existing intermittent coupling reactions, diazo salt stay too long in the reactor, the batch reactor is overheated, diazo salts may be decomposed easily, which leading to low yields, low quality and great energy consumption, all batches of products differ in shade, intensity, and so on. Using continuous process production technology, controlling diazo salt and coupling component to rapidly and equally contact, the heat released from reaction quickly transfers away from the reaction media, which can greatly improve product quality and yield of azo dyes, reaching quality stability requirements about dye products by dying industry from root. Furthermore, water-soluble azo dyes preparation reaction is carried out at room temperature in the device without external cold source, which has obvious energy saving features to achieve energy-saving, high efficiency and high quality production of water-soluble azo dyes.

Due to the short reaction time, high productivity, continuous synthesis technology plays a very important role in chemical synthesis, in particular micro-reactor with excellent thermal performance. Robert C. R. Wootton et al. use aniline diazo salts and 2-naphthol to carry out coupling reaction to synthesize azo dyes in micro-reactor. Crane Company (Org Pro Res and Dev, 2004, 8:440, 454; CN01121867.3; CN01804731.9) performed the synthesis of pigment products using micro-reactor technology, the process consists of three steps: diazotization reaction, coupling reaction, pigmentation reaction. In the first step, two liquids carry out diazotization reaction in a micro-reactor, followed by coupling reaction of diazo salt solution and coupling component in second micro-reactor, and finally carrying out pigmentation reaction in third micro-reactor. The results of reaction show that pigment particles has an average diameter of 90 nm with micro-reactor, while the resulting particle size with a conventional reactor is 598 nm, and pigment particle size distribution from micro-reactor has been dramatically narrowed. Using micro-reactors, the color strength (Color Strength) of product than that resulted from conventional reactors has been increases by 19%~39%; the brightness (Brightness) increases 5~6 levels, transparency (Transparency) has been increased by 5~6 levels. However, the production process of micro-reactor is quite complex and the equipment are expensive, and once the passages are plugged, it is difficult to clean. It only applies to reaction that will not lead to jam and small amount of micro-reactor materials handling. It is difficult to apply in large-scale dye production.

SUMMARY OF THE INVENTION

The invention provides a method for continuously preparing water-soluble azo dye by coupling a nebulizer with a pipeline. The droplets nebulized by nebulizer have advantages of small particle diameter and high specific surface area, thus diazo salt and coupling component are respectively nebulized and move face to face, which can make them fully contact and further enhance the mixing and reaction rate. Coupling of nebulizer and pipeline with interception column plate can make the reaction liquid stream which has been nebulized and mixed flow through the pipeline with interception column plate. By turbulently mixing on column plate, the mix and reaction of liquid stream are further enhanced, and the immediately separation of reaction heat of nebulization contact reaction from the reactants is achieved. A small amount of un-reacted components react on the column plate and flow downward quickly under gravity; generated reaction heat are transferred and dissipated on the column plate quickly, thus achieving fast and continuous water-soluble azo dye production under atmospheric temperature. The preparation method of this invention is simple, compared to preparation of the same kind of dye with a batch reactor, external cold source for cooling is not acquired during the preparation process of water-soluble azo dye of this invention, thereby obviously reducing energy consumption and achieving energy-saving and high efficiency and high quality production of water-soluble azo dyes.

The present invention is embodied by the follow technical solution relating:

A method for continuously preparing water-soluble azo dye: coupling component solution and diazo salt solution respectively transferred to nebulizing unit of coupling component solution and the nebulizing unit of diazo salt solution by constant flow pump. The continuously nebulized droplets of diazo salt solution and coupling component are fully contacted, mixed and occurs coupling reaction, and further mixed and reacted on the pipeline with interception column plate, forming water-soluble azo dye; external cold source or heat source is not needed for the continuous reactor.

In a preferred embodiment, the angle between the axial direction of nebulizing unit of diazo salt solution and the axial direction of nebulizing unit of coupling component solution is 0-180°.

In another preferred embodiment, the number of interception column plate of the pipeline unit of the reactor is 1-500, the angle between the interception column plate and the pipe wall is 0-180°.

The method provided by this invention in which the nebulized droplets of diazo salt solution and coupling component by nebulizing units move face to face in certain angle, fully contacted, forming liquid stream during the process of descending. The liquid stream flows in the pipeline with interception column plate, the two components thus are fully contacted due to turbulence, obtaining water-soluble azo dye solution. External cold source or heat source is not needed for the continuous reactor provided by this invention.

In addition, the droplets nebulized by nebulizer have advantages of small particle diameter and high specific surface area, thus diazo salt and coupling component are respectively nebulized and move face to face, which can make them fully contact and further enhance the mixing and reaction rate. Coupling of nebulizer and pipeline with interception column plate can make the reaction liquid stream which has been nebulized and mixed flow through the pipeline with interception column plate.

By turbulently mixing on column plate, the mix and reaction of liquid stream are further enhanced, and the immediately separation of reaction heat of nebulization contact reaction from the reactants is achieved. A small amount of unreacted components react on the column plate and flow downward quickly under gravity; generated reaction heat are transferred and dissipated on the column plate quickly, thus achieving fast and continuous water-soluble azo dye production under atmospheric temperature.

The method provided by this invention, according to different pH values in the coupling reaction process, can be divided into two processes of coupling under alkaline condition and coupling under acidic condition:

(1) Coupling under acidic conditions: arylamines coupling component is dissolved in water (adjust pH value less than 7), and coupling component solution and diazo salt solution respectively are transferred to nebulizing reactors by constant flow pump. The droplets nebulized by nebulizer move face to face and are fully contacted, then enter into the pipeline with interception column plate. Control flow rate and adjust pH of reaction materials which keep the pH value of product solution of the reactor outlet less than 5 to give water-soluble azo dye solution;

(2) Coupling under alkaline conditions: coupling component containing active methylene or phenolic hydroxyl is dissolved in water and adjusts its pH value above 9; coupling component solution and diazo salt solution respectively are transferred to nebulizing reactors by constant flow pump. The droplets nebulized by nebulizer move face to face and are fully contacted, then enter into the pipeline with interception column plate. Control flow rate and adjust pH of reaction materials which keep the pH value of product solution of the reactor outlet above 7 to give water-soluble azo dye solution.

The method for continuously preparing water-soluble azo dye by coupling a nebulizer with a pipeline provided by this invention, its core lies in the nebulizer and pipeline coupling. Using the characteristics of small particle diameter, high specific surface area and easily being contacted and mixed of nebulized droplet by nebulizer, diazo salt and coupling component can be fully contacted and quickly mixed. Coupling of nebulizer and pipeline with interception column plate can make the reaction liquid stream which has been nebulized and rapidly mixed flow through the pipeline with interception column plate. A small amount of unreacted components react on the column plate and flow downward quickly under gravity; the immediately separation of reaction heat of nebulization contact reaction from the reactants is achieved and generated reaction heat is transferred and dissipated on the column plate quickly, thus achieving fast and continuous water-soluble azo dye production. The preparation method of this invention is simple, compared to preparation of the same kind of dye with a batch reactor, external cold source for cooling is not acquired during the preparation process of water-soluble azo dye of this invention, thereby obviously reducing energy consumption and achieving energy-saving, high efficiency and high quality production of water-soluble azo dyes. The method has broad application perspective.

BRIEF DESCRIPTION OF THE DRAWINGS

FIG. 1 is a schematic diagram of nebulizer-pipeline coupling continuous reactor of the present invention;

DETAILED DESCRIPTION OF THE PREFERRED EMBODIMENTS

The following embodiments may enable ordinary technicians to fully understand this invention, but do not limit the invention in any manner.

Embodiment 1

Preparation of coupling component solution: 6.82 g of 1-amino-8-hydroxy-3,6-naphthalene disulfonic acid was added into 250 mL containing 40 mL water, then the sodium carbonate solution with 20% concentration was added under stirring. The resulting mixture was adjusted to a pH 6.0-6.5, and diluted with water to a total volume of 200 mL, then the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 30 ml/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 10, the angle between interception column plate and pipe wall is 60°, the pH value of product solution of the reactor outlet is 2-3, getting water-soluble azo dye solution.

Embodiments 2-30

Using methoxy aniline diazo salt solution, o-chloroaniline diazo salt solution, 1-naphthylamine diazo salt solution, aniline-2,5-disulfonic acid diazo salt solution, p-nitroaniline diazo salt solution, m-nitroaniline diazo salt solution, o-nitroaniline diazo salt solution, p-nitrile aniline diazo salt solution, p-amino benzene sulfonic acid diazo salt solution, o-amino benzene sulfonic acid diazo salt solution, 1-amino-4-naphthalene sulfonic acid diazo salt solution and solution of diazo salt with structure 1-18# to replace diazo salt solution to react with 1-amino-8-hydroxy-3,6-naphthalene disulfonic acid solution in nebulizer-pipeline coupling continuous reactors respectively, obtaining corresponding water-soluble azo dye solution, other conditions are consistent with the Embodiment 1.

1#

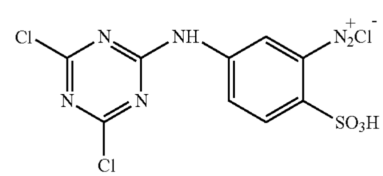

2#

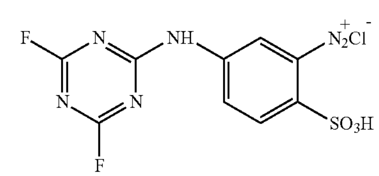

3#
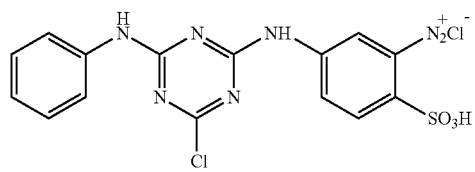

4#
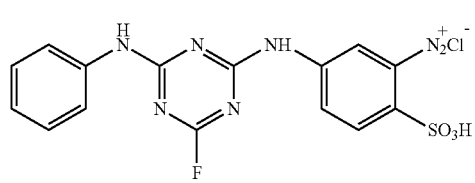

5#
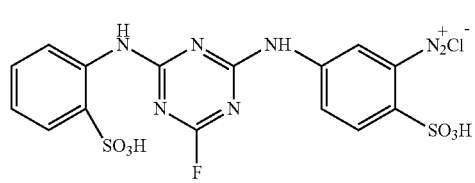

6#
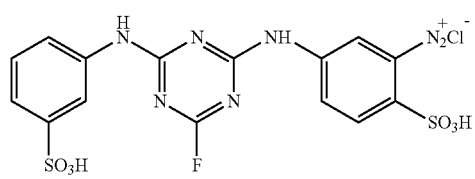

7#
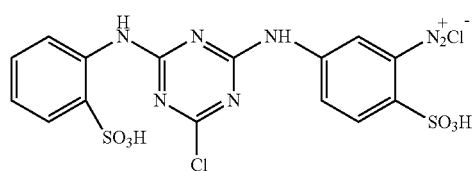

8#
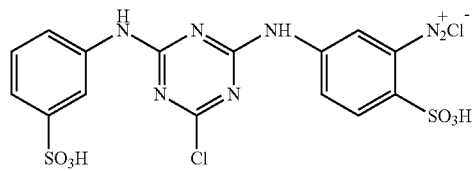

9#
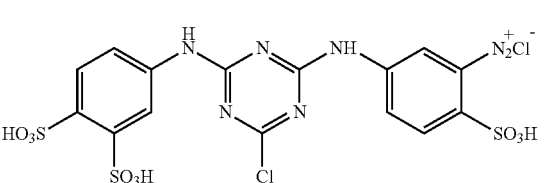

10#
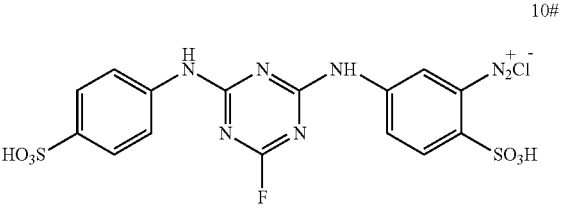

11#

12#
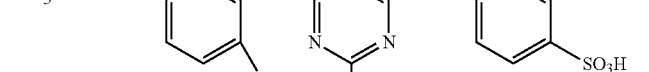

13#

14#
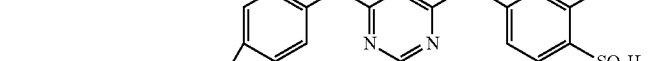

15#

16#
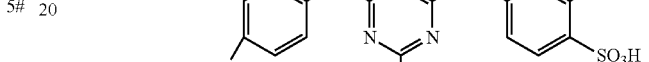

17#

18#

Embodiments 31-41

Using 1-naphthylamine-6-sulfonic acid, 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene sulfonic acid, 1-anilino-8-naphthalene sulfonic acid solution and solution of coupling components with the structural formula 19-22# to replace 1-amino-8-hydroxy-3,6-naphthalene disulfonic acid solution to react with aniline diazo salt solution in nebulizer-pipeline coupling continuous reactor, getting corresponding water-soluble azo dye solution, other conditions are in consistent with the Embodiment 1.

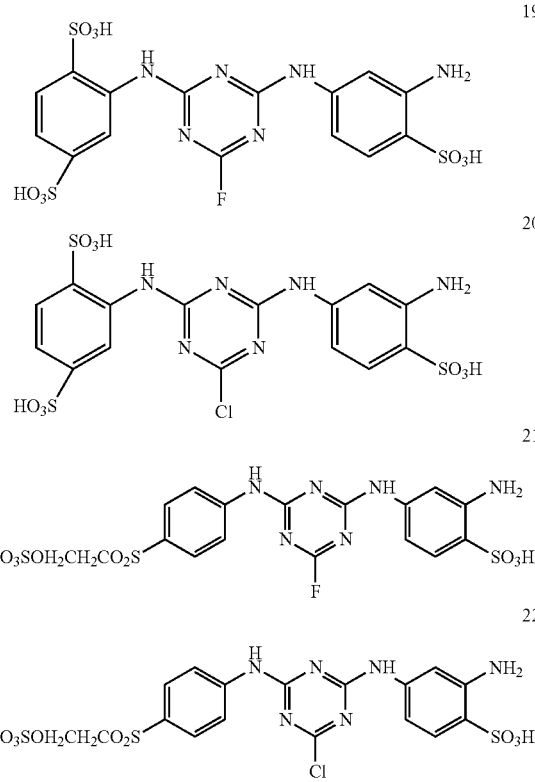

Embodiments 42-52

Using 1-naphthylamine-6-sulfonic acid, 2-amino-8-hydroxy-6-naphthalene sulfonic acid 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene sulfonic acid, 1-anilino-8-naphthalene sulfonic acid solution and solutions of coupling component with the structural formula 19-22# to replace 1-amino-8-hydroxy-3,6-naphthalene disulfonic acid solution to react with p-nitroaniline diazo salt solution in nebulizer-pipeline coupling continuous reactor, getting corresponding water-soluble azo dye solution, other conditions are in consistent with the Embodiment 1.

Embodiments 53-63

Using 1-naphthylamine-6-sulfonic acid, 2-amino-8-hydroxy-6-naphthalene sulfonic acid 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-anilino-8-naphthalene sulfonic acid solution and solutions of coupling components with the structural formula 19-22# to replace 1-amino-8-hydroxy-3,6-naphthalene disulfonic acid solution to react with p-amino benzene sulfonic acid diazo salt solution in nebulizer-pipeline coupling continuous reactor, getting corresponding water-soluble azo dye solution, other conditions are in consistent with the Embodiment 1.

Embodiments 64-74

Using 1-naphthylamine-6-sulfonic acid, 2-amino-8-hydroxy-6-naphthalene sulfonic acid 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-anilino-8-naphthalene sulfonic acid solution and solutions of coupling components with the structural formula 19-22# to replace 1-amino-8-hydroxy-3,6-naphthalene disulfonic acid solution to react with the solution of diazo salt with the structural formula 19 # in nebulizer-pipeline coupling continuous reactor, getting corresponding water-soluble azo dye solution, other conditions are in consistent with the Embodiment 1.

Embodiments 75-85

Using 1-naphthylamine-6-sulfonic acid, 2-amino-8-hydroxy-6-naphthalene sulfonic acid 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-anilino-8-naphthalene sulfonic acid solution and solutions of coupling components with the structural formula 19-22# to replace 1-amino-8-hydroxy-3,6-naphthalene disulfonic acid solution to react with solution of diazo salt with the structural formula 26# in nebulizer-pipeline coupling continuous reactor, getting corresponding water-soluble azo dye solution, other conditions are in consistent with the Embodiment 1.

Embodiments 86-96

Using 1-naphthylamine-6-sulfonic acid, 2-amino-8-hydroxy-6-naphthalene sulfonic acid 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-anilino-8-naphthalene sulfonic acid solution and solutions of coupling components with structure 19-22# to replace 1-amino-8-hydroxy-3,6-naphthalene disulfonic acid solution to react with solution of diazo salt with the structural formula 30# in nebulizer-pipeline coupling continuous reactor, getting corresponding water-soluble azo dye solution, other conditions are in consistent with the Embodiment 1.

Embodiment 97

Preparation of coupling component solution: 3.18 g of 1-amino-8-hydroxy-3,6-naphthalene disulfonic acid was added into 250 ml containing 40 mL water, then the sodium carbonate solution with 20% concentration was added under stirring. The resulting mixture was adjusted to a pH 9.5-9.9, and the solution was diluted with water to a total volume of 200 mL.

Using p-nitroaniline diazo salt solution described in Embodiments 1-30 in nebulizer-pipeline coupling continuous reactor to react with 1-amino-8-hydroxy-3,6-naphthalene disulfonic acid solution in nebulizer-pipeline coupling continuous reactor respectively. The pH value of product solution of reactor outlet is 7.0-8.0, getting water-soluble azo dye solution.

Embodiments 98-109

Using 2-amino-8-hydroxy-6-naphthalene sulfonic acid, 2-amino-5-hydroxy-7-naphthalene sulfonic acid, 2-amino-8- hydroxy-3,6-naphthalene disulfonic acid, 1-amino-8-hydroxy-4-naphthalene sulfonic acid, 1-amino-8-hydroxy-2,4-naphthalene disulfonic acid, 1-benzoyl amino-8-hydroxy-3,6-naphthalene disulfonic acid, 1-acetylamino-8-hydroxy-3,6-naphthalene disulfonic acid, 2-amino-8-acetylhydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with p-nitroaniline diazo salt solution in nebulizer-pipeline coupling continuous reactor, getting corresponding water-soluble azo dye solution, other conditions are in consistent with the Embodiment 97.

Embodiments 110-121

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with aniline diazo salt solution in nebulizer-pipeline coupling continuous reactor, getting corresponding water-soluble azo dye solution, other conditions are in consistent with the Embodiment 97.

Embodiments 122-133

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with p-aminobenzene sulfonic acid diazo salt solution in nebulizer-pipeline coupling continuous reactor, getting corresponding water-soluble azo dye solution, other conditions are in consistent with the Embodiment 97.

Embodiments 134-145

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with solution of aniline diazo salt with the structural formula 2# in nebulizer-pipeline coupling continuous reactor, getting corresponding water-soluble azo dye solution, other conditions are in consistent with the Embodiment 97.

Embodiments 146-157

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with solution of aniline diazo salt with the structural formula 7# in nebulizer-pipeline coupling continuous reactor, getting corresponding water-soluble azo dye solution, other conditions are in consistent with the Embodiment 97.

Embodiments 158-169

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with solution of aniline diazo salt with the structural formula 12# in nebulizer-pipeline coupling continuous reactor, getting corresponding water-soluble azo dye solution, other conditions are in consistent with the Embodiment 97.

Embodiments 170-181

Using 2-amino-8-hydroxy-6-naphthalene sulfonic acid, 2-amino-5-hydroxy-7-naphthalene sulfonic acid, 2-amino-8-hydroxy-3,6-naphthalene disulfonic acid, 1-amino-8-hydroxy-4-naphthalene sulfonic acid, 1-amino-8-hydroxy-2,4-naphthalene disulfonic acid, 1-benzoylamino-8-hydroxy-3,6-naphthalene disulfonic acid, 1-acetylamino-8-hydroxy-3,6-naphthalene disulfonic acid, 2-acetylamino-8-hydroxy-6-naphthalene sulfonic acid, 2-acetylamino-5-hydroxy-7-naphthalene sulfonic acid, 2-acetylamino-8-hydroxy-3,6-naphthalene disulfonic acid, 1-acetylamino-8-hydroxy-4-naphthalene sulfonic acid, 1-acetylamino-8-hydroxy-2,4-naphthalene disulfonic acid solution to replace 1-amino-8-hydroxy-3,6-naphthalene disulfonic acid solution to react with solution of aniline diazo salt with the structural formula 17# in nebulizer-pipeline coupling continuous reactor, getting corresponding water-soluble azo dye solution, other conditions are in consistent with the Embodiment 97.

Embodiments 182-211

Preparation of coupling component solution: 2.54 g of p-1-sulfophenyl-3-methyl-5-pyrazolone was added into 250 ml flask containing 40 mL water, then the sodium carbonate solution with 20% concentration was added under stirring. The resulting mixture was adjusted to pH 9.5-9.9, and the solution was diluted with water to a total volume of 200 mL.

Using the solution of diazo salt described in embodiments 1-30 to react with p-1-sulfophenyl-3-methyl-5-pyrazolone solution in the nebulizer-pipeline coupling continuous reactor respectively. The pH value of product solution of reactor outlet is 7.0-8.0, getting water-soluble azo dye solution.

Embodiments 212-241

Using the solutions of coupling components with the structural formula 23-25# to replace p-1-sulfophenyl-3-methyl-5-pyrazolone solution to react with aniline diazo salt with the structural formula 17 # in nebulizer-pipeline coupling continuous reactor, getting corresponding water-soluble azo dye solution, and other conditions are in consistent with the Embodiment 182.

23#

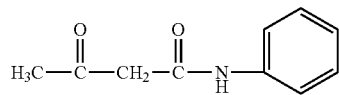

24#

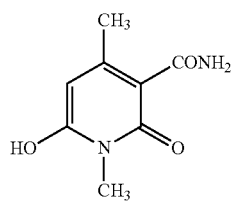

25#

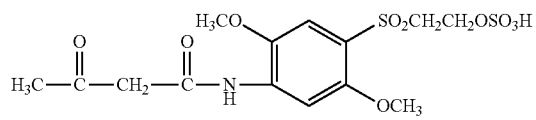

Embodiments 242-244

Using the solutions of coupling components with the structural formula 23-25# to replace p-1-sulfophenyl-3-methyl-5-pyrazolone solution to react with P-amino benzene sulfonic acid diazo salt solution in nebulizer-pipeline coupling continuous reactor, getting corresponding water-soluble azo dye solution, and other conditions are in consistent with the Embodiment 182.

Embodiments 245-247

Using the solutions of coupling components with the structural formula 23-25# to replace p-1-sulfophenyl-3-methyl-5-pyrazolone solution to react with aniline diazo salt with the structural formula 14 # in nebulizer-pipeline coupling continuous reactor, getting corresponding water-soluble azo dye solution, and other conditions are in consistent with the Embodiment 182.

Embodiments 248-250

Using the solutions of coupling components with the structural formula 23-25# to replace p-1-sulfophenyl-3-methyl-5-pyrazolone solution to react with aniline diazo salt with the structural formula 11# in nebulizer-pipeline coupling continuous reactor, getting corresponding water-soluble azo dye solution, and other conditions are in consistent with the Embodiment 182.

Embodiments 251-253

Using solutions of coupling components with structural formula 23-25# coupling component solution to replace p-1-sulfophenyl-3-methyl-5-pyrazolone solution to react with aniline diazo salt with the structural formula 7# in nebulizer-pipeline coupling continuous reactor, getting corresponding water-soluble azo dye solution, and other conditions are in consistent with the Embodiment 182.

Embodiments 254-284

Using solutions of coupling components with structural formula 26-56# to replace 1-amino-8-hydroxy-3,6-naphthalene disulfonic acid solution to react with aniline diazo salt with the structural formula 1# in nebulizer-pipeline coupling continuous reactor, getting corresponding water-soluble azo dye solution, and other conditions are in consistent with the Embodiment 97.

26#

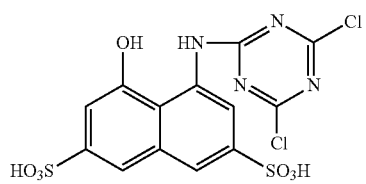

27#

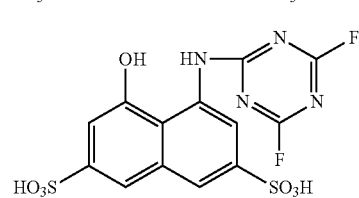

28#

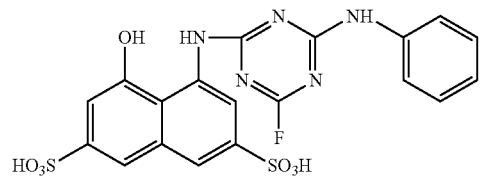

29#

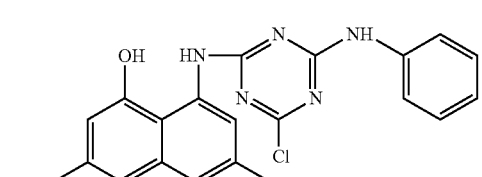

30#
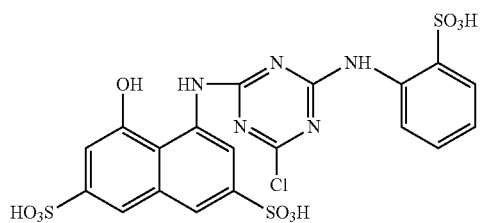
31#
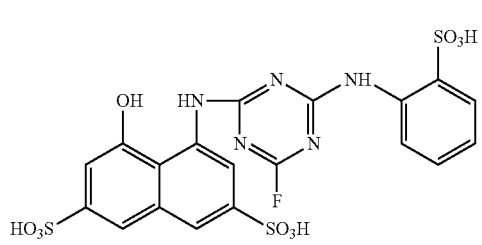
32#
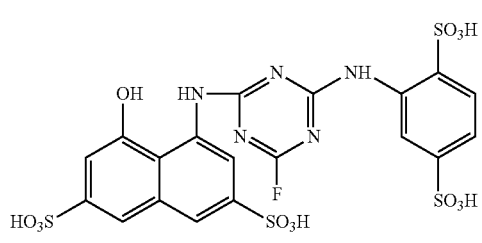
33#
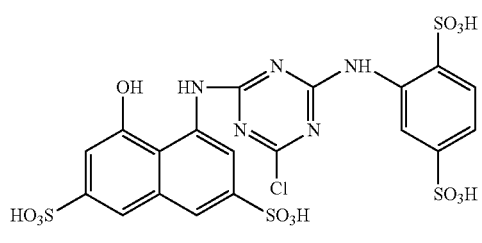
34#
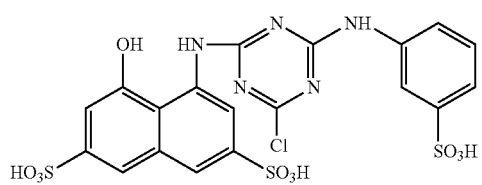
35#
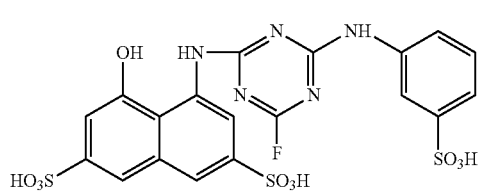
36#
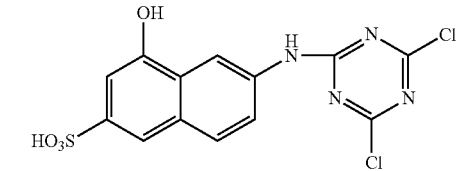
37#
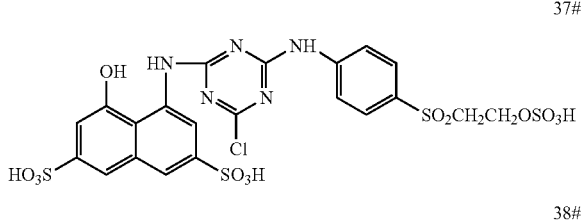
38#
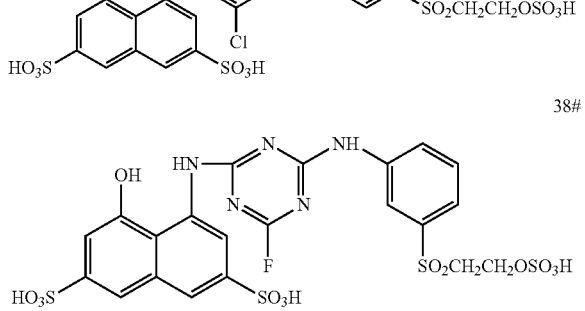
39#
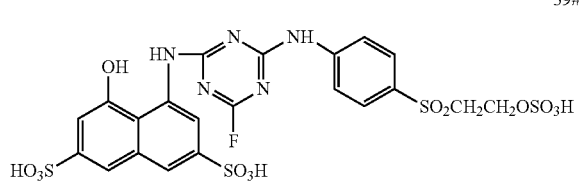
40#
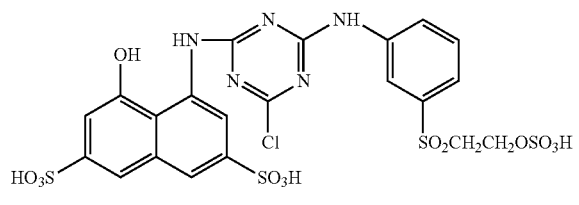
41#
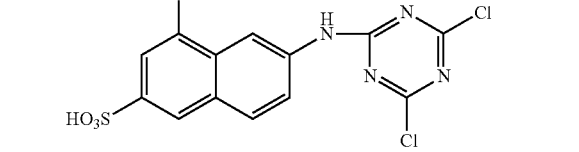
52#
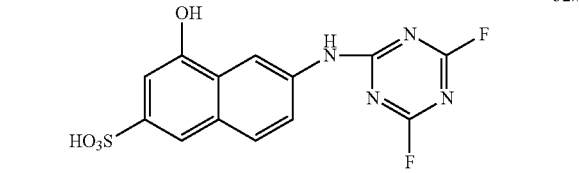
43#
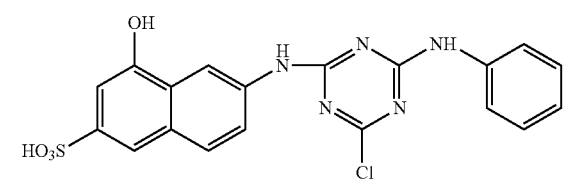
44#
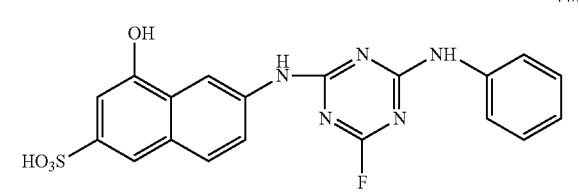

45#
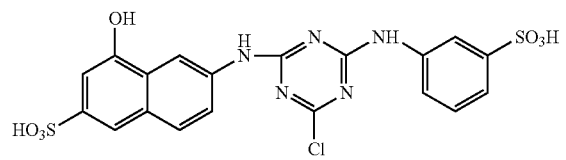

46#
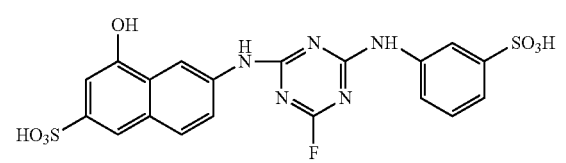

47#
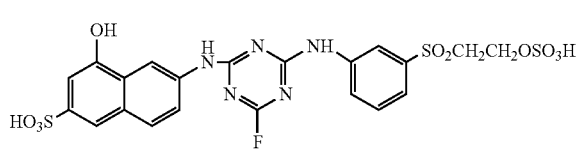

48#
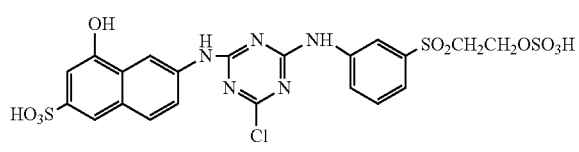

49#
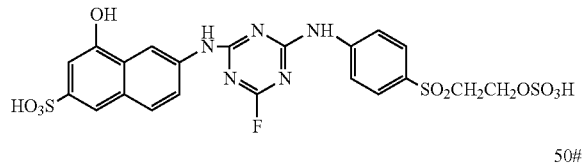

50#
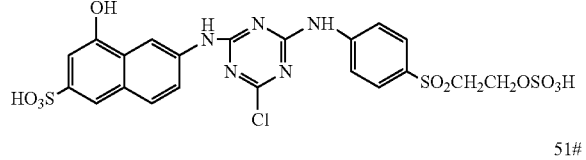

51#
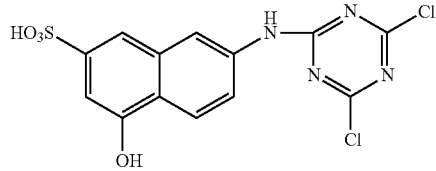

52#
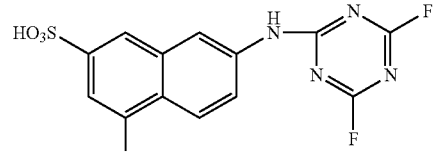

53#
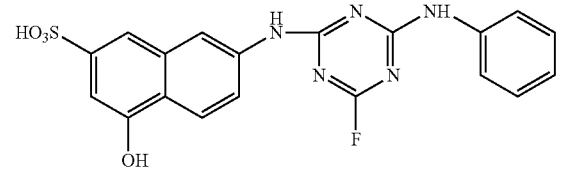

54#
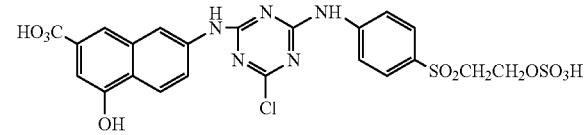

55#
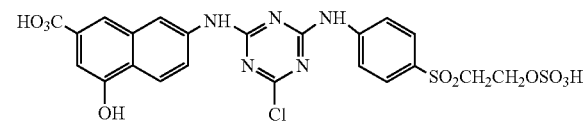

56#
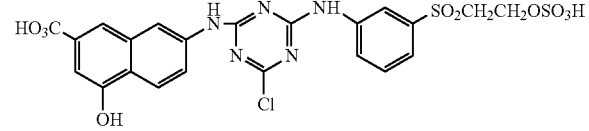

Embodiments 285-315

Using solutions of coupling components with structural formula 26-56# to replace 1-amino-8-hydroxy-3,6-naphthalene disulfonic acid solution to react with p-nitroaniline diazo salt in nebulizer-pipeline coupling continuous reactor, getting corresponding water-soluble azo dye solution, and other conditions are in consistent with the Embodiment 97.

Embodiments 316-346

Using solutions of coupling components with structural formula 26-56# to replace 1-amino-8-hydroxy-3,6-naphthalene disulfonic acid solution to react with aniline diazo salt in nebulizer-pipeline coupling continuous reactor, getting corresponding water-soluble azo dye solution, and other conditions are in consistent with the Embodiment 97.

Embodiments 347-377

Using solutions of coupling components with structural formula 26-56# to replace 1-amino-8-hydroxy-3,6-naphthalene disulfonic acid solution to react with P-amino benzene sulfonic acid diazo salt in nebulizer-pipeline coupling continuous reactor, getting corresponding water-soluble azo dye solution, and other conditions are in consistent with the Embodiment 97.

Embodiments 378-408

Using solutions of coupling components with structural formula 26-56# to replace 1-amino-8-hydroxy-3,6-naphthalene disulfonic acid solution to react with diazo salt with the structural formula 3# in nebulizer-pipeline coupling continuous reactor, getting corresponding water-soluble azo dye solution, and other conditions are in consistent with the Embodiment 97.

Embodiments 409-439

Using solutions of coupling components with the structural formula 26-56# to replace 1-amino-8-hydroxy-3,6-naphthalene disulfonic acid solution to react with diazo salt with the structural formula 5# in nebulizer-pipeline coupling continuous reactor, getting corresponding water-soluble azo dye solution, and other conditions are in consistent with the Embodiment 97.

Embodiments 440-470

Using solutions of coupling components with the structural formula 26-56# to replace 1-amino-8-hydroxy-3,6-naphthalene disulfonic acid solution to react with diazo salt with the structural formula 7# in nebulizer-pipeline coupling continuous reactor, getting corresponding water-soluble azo dye solution, and other conditions are in consistent with the Embodiment 97.

Embodiments 471-501

Using solutions of coupling components with the structural formula 26-56# to replace 1-amino-8-hydroxy-3,6-naphthalene disulfonic acid solution to react with diazo salt with the structural formula 9# in nebulizer-pipeline coupling continuous reactor, getting corresponding water-soluble azo dye solution, and other conditions are in consistent with the Embodiment 97.

Embodiments 502-532

Using solutions of coupling components with the structural formula 26-56# to replace 1-amino-8-hydroxy-3,6-naphthalene disulfonic acid solution to react with diazo salt with the structural formula 11# in nebulizer-pipeline coupling continuous reactor, getting corresponding water-soluble azo dye solution, and other conditions are in consistent with the Embodiment 97.

Embodiments 533-563

Using solutions of coupling components with the structural formula 26-56# to replace 1-amino-8-hydroxy-3,6-naphthalene disulfonic acid solution to react with diazo salt with the structural formula 13# in nebulizer-pipeline coupling continuous reactor, getting corresponding water-soluble azo dye solution, and other conditions are in consistent with the Embodiment 97.

Embodiments 564-594

Using solutions of coupling components with the structural formula 26-56# to replace 1-amino-8-hydroxy-3,6-naphthalene disulfonic acid solution to react with diazo salt with the structural formula 15# in nebulizer-pipeline coupling continuous reactor, getting corresponding water-soluble azo dye solution, and other conditions are in consistent with the Embodiment 97.

Embodiments 595-625

Using solutions of coupling components with the structural formula 26-56# to replace 1-amino-8-hydroxy-3,6-naphthalene disulfonic acid solution to react with diazo salt with the structural formula 18# in nebulizer-pipeline coupling continuous reactor, getting corresponding water-soluble azo dye solution, and other conditions are in consistent with the Embodiment 97.

Embodiments 626-668

Using solutions of coupling components with the structural formula 57-99# to replace 1-amino-8-hydroxy-3,6-naphthalene disulfonic acid solution to react with diazo salt with the structural formula 18# in nebulizer-pipeline coupling continuous reactor, getting corresponding water-soluble azo dye solution, and other conditions are in consistent with the Embodiment 97.

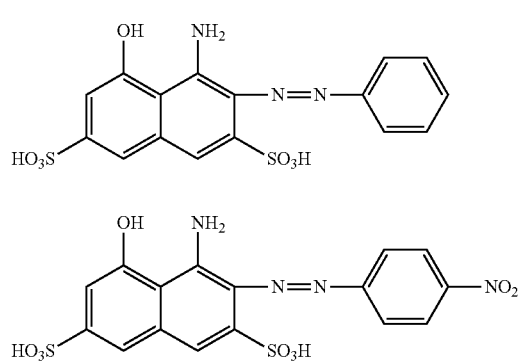
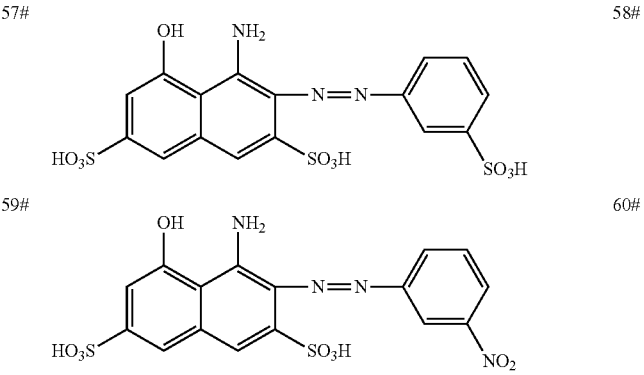

-continued
65#
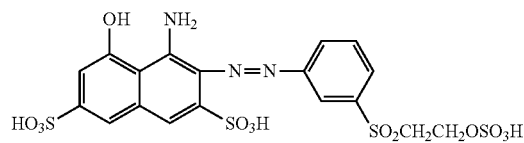
66#
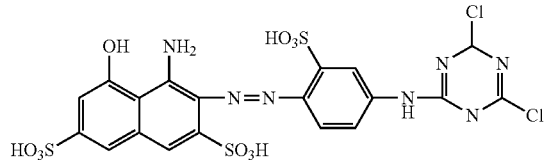
67#
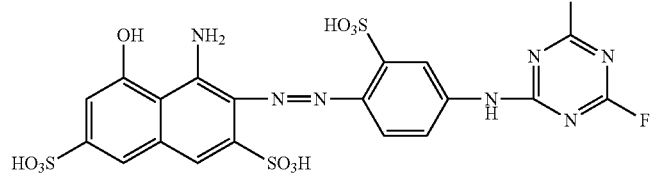
68#
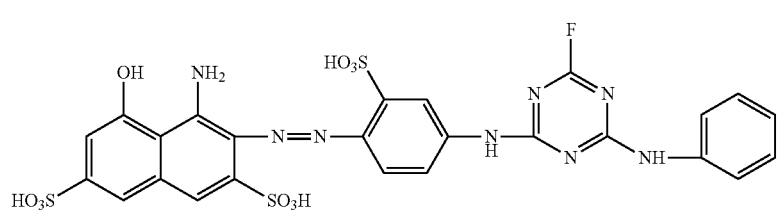
69#
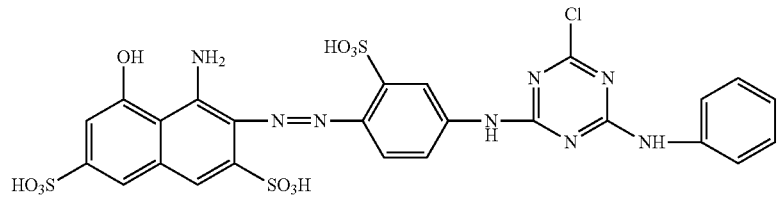
70#
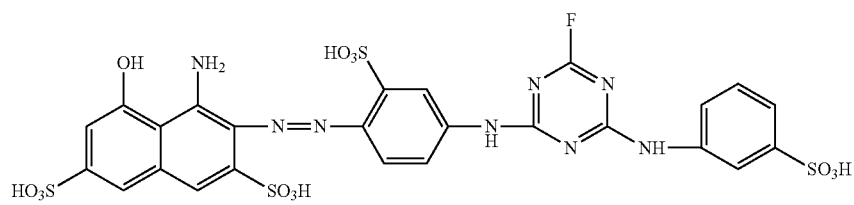
71#
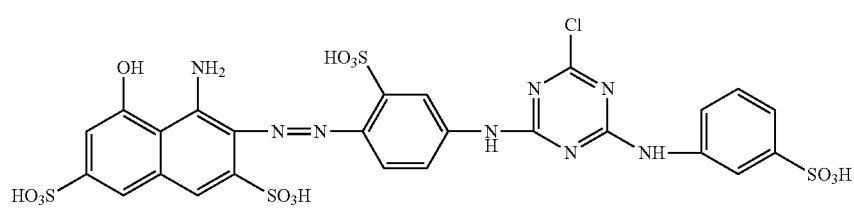
72#
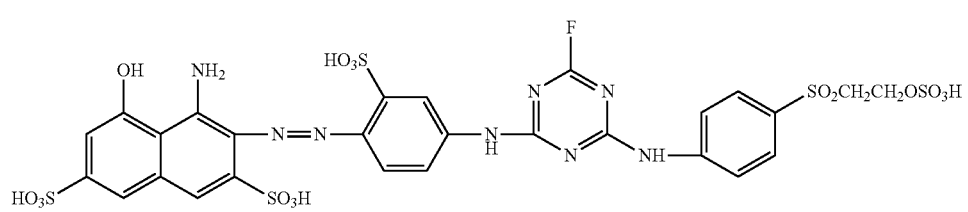
73#
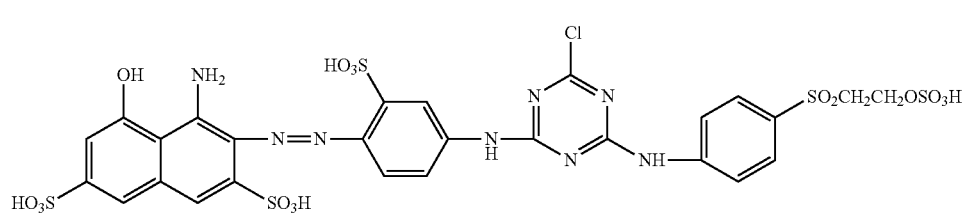

74#
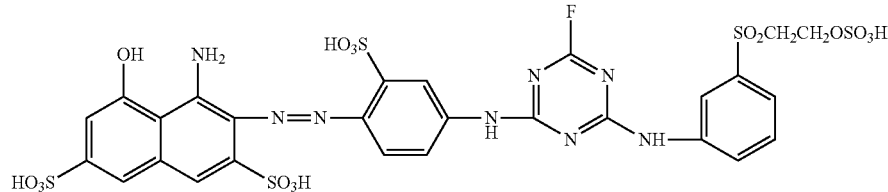
75#
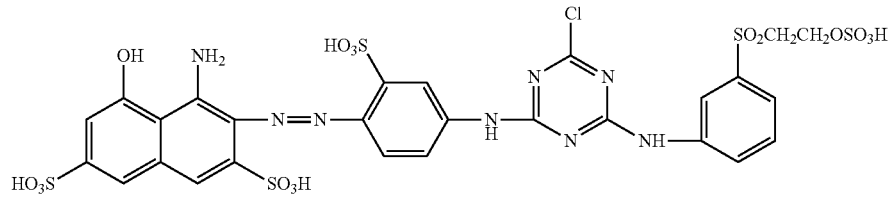
76#
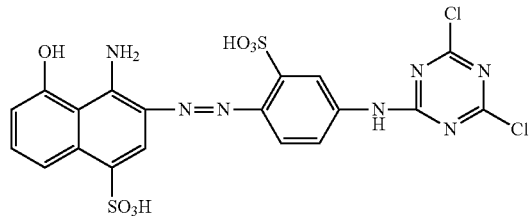
77#
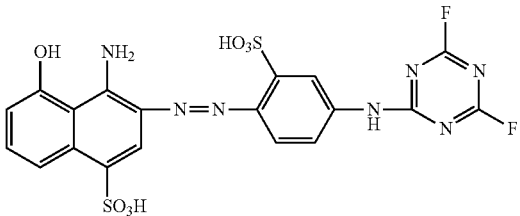
78#
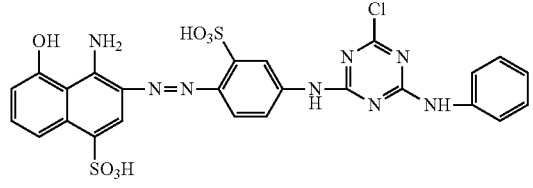
79#
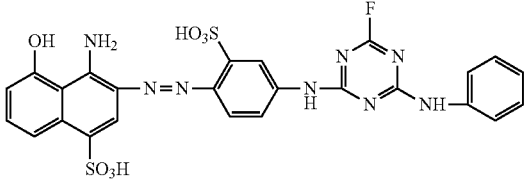
80#
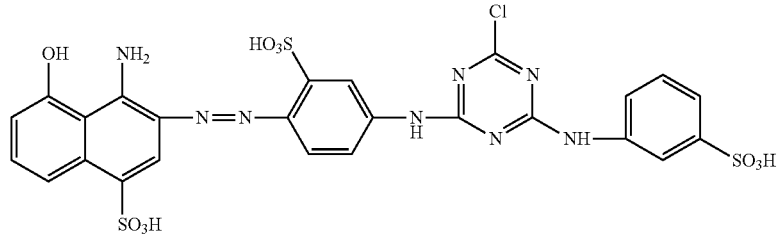
81#
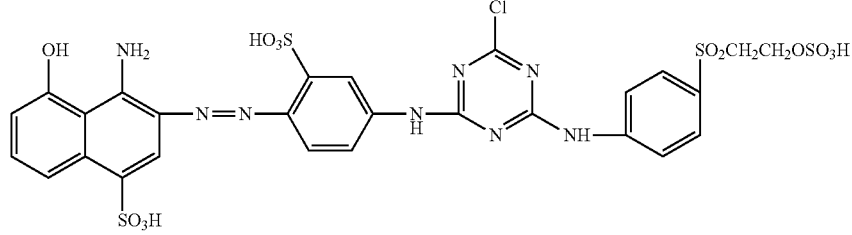
82#
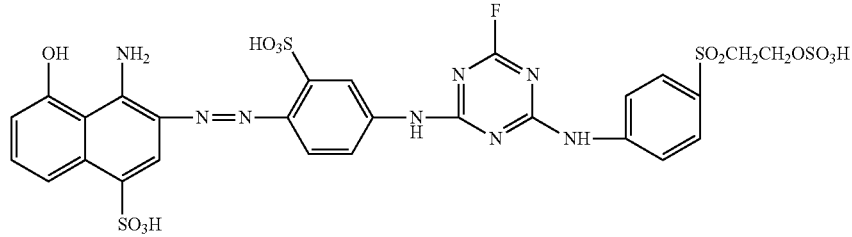

-continued
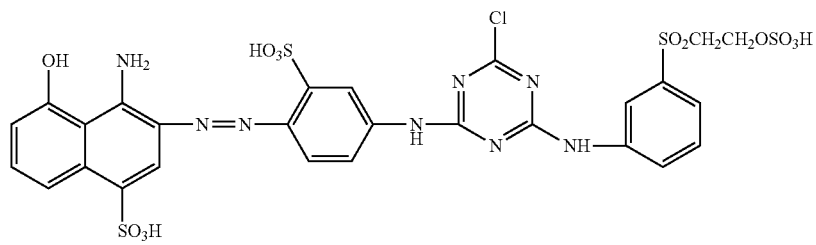
83#
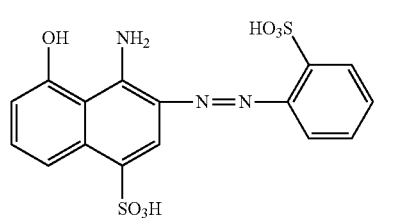
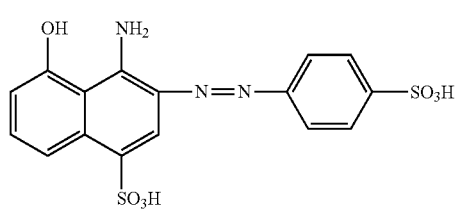
84#  85#
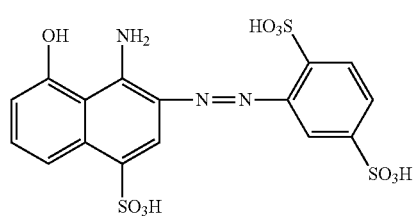
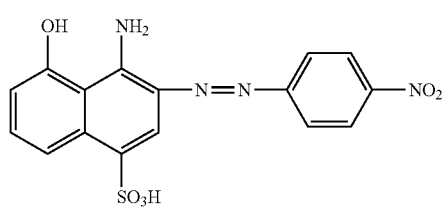
86#  87#
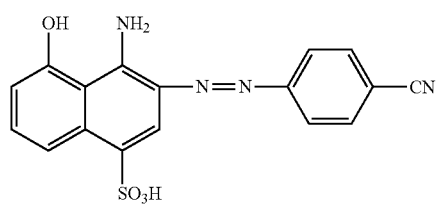
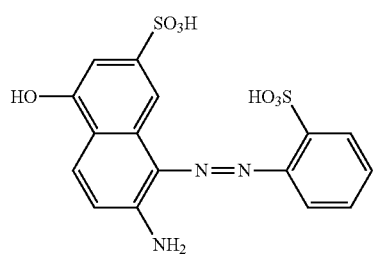
88#  89#
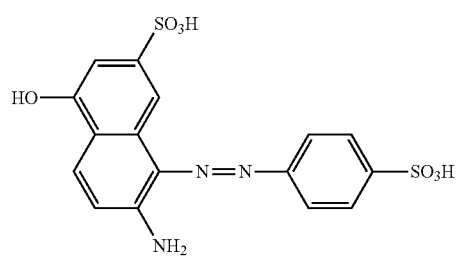
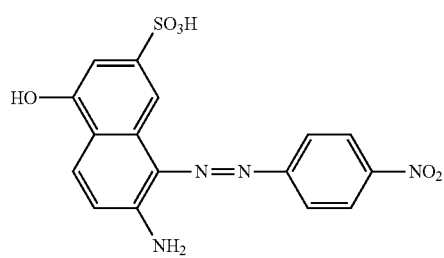
90#  91#
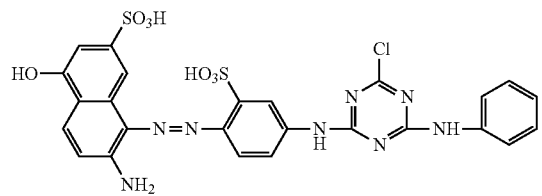
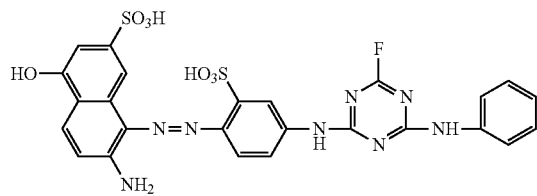
92#  93#

94#
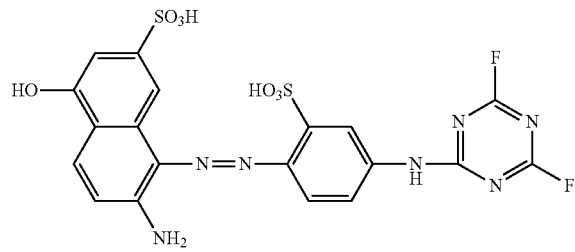

95#
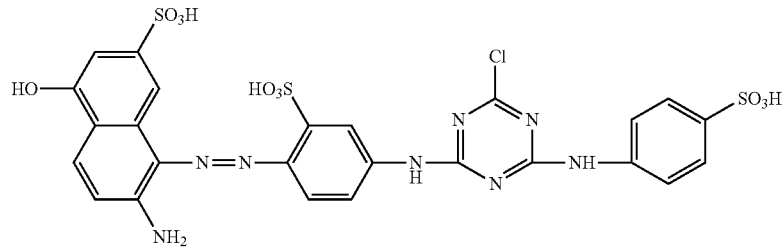

96#
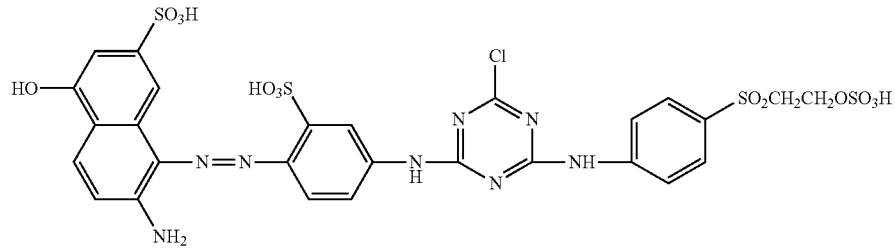

97#
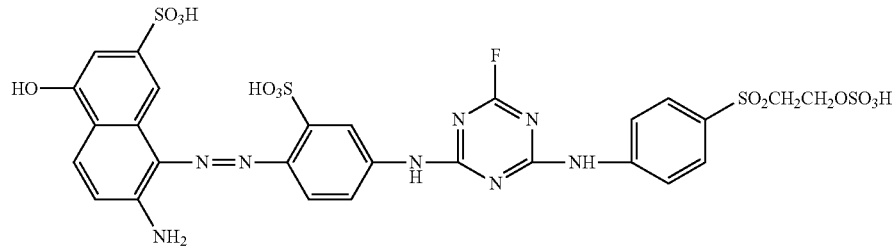

98#
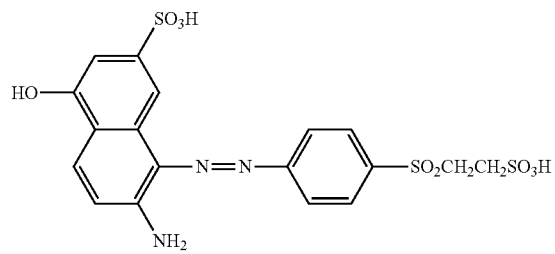

99#
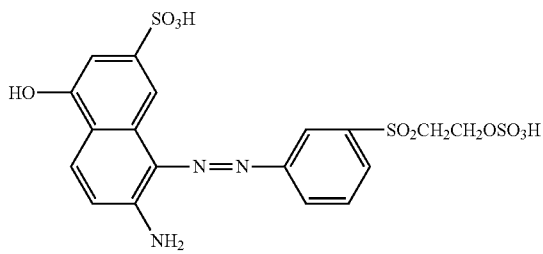

Embodiments 669-711

Using solutions of coupling components with the structural formula 57-99# to replace 1-amino-8-hydroxy-3,6-naphthalene disulfonic acid solution to react with diazo salt with the structural formula 17# in nebulizer-pipeline coupling continuous reactor, getting corresponding water-soluble azo dye solution, and other conditions are in consistent with the Embodiment 97.

Embodiments 712-754

Using solutions of coupling components with the structural formula 57-99# to replace 1-amino-8-hydroxy-3,6-naphthalene disulfonic acid solution to react with diazo salt with the structural formula 15# in nebulizer-pipeline coupling continuous reactor, getting corresponding water-soluble azo dye solution, and other conditions are in consistent with the Embodiment 97.

Embodiments 755-797

Using solutions of coupling components with the structural formula 57-99# to replace 1-amino-8-hydroxy-3,6-naphthalene disulfonic acid solution to react with diazo salt with the structural formula 13# in nebulizer-pipeline coupling continuous reactor, getting corresponding water-soluble azo dye solution, and other conditions are in consistent with the Embodiment 97.

Embodiments 798-840

Using solutions of coupling components with the structural formula 57-99# to replace 1-amino-8-hydroxy-3,6-naphthalene disulfonic acid solution to react with diazo salt with the structural formula 11# in nebulizer-pipeline coupling continuous reactor, getting corresponding water-soluble azo dye solution, and other conditions are in consistent with the Embodiment 97.

Embodiments 841-883

Using solutions of coupling components with the structural formula 57-99# to replace 1-amino-8-hydroxy-3,6-naphthalene disulfonic acid solution to react with diazo salt with the structural formula 9# in nebulizer-pipeline coupling continuous reactor, getting corresponding water-soluble azo dye solution, and other conditions are in consistent with the Embodiment 97.

Embodiments 884-926

Using solutions of coupling components with the structural formula 57-99# to replace 1-amino-8-hydroxy-3,6-naphthalene disulfonic acid solution to react with diazo salt with the structural formula 7# in nebulizer-pipeline coupling continuous reactor, getting corresponding water-soluble azo dye solution, and other conditions are in consistent with the Embodiment 97.

Embodiments 927-969

Using solutions of coupling components with the structural formula 57-99# to replace 1-amino-8-hydroxy-3,6-naphthalene disulfonic acid solution to react with diazo salt with the structural formula 5# in nebulizer-pipeline coupling continuous reactor, getting corresponding water-soluble azo dye solution, and other conditions are in consistent with the Embodiment 97.

Embodiments 970-1012

Using solutions of coupling components with the structural formula 57-99# to replace 1-amino-8-hydroxy-3,6-naphthalene disulfonic acid solution to react with diazo salt with the structural formula 3# in nebulizer-pipeline coupling continuous reactor, getting corresponding water-soluble azo dye solution, and other conditions are in consistent with the Embodiment 97.

Embodiments 1013-1055

Using solutions of coupling components with the structural formula 57-99# to replace 1-amino-8-hydroxy-3,6-naphthalene disulfonic acid solution to react with diazo salt with the structural formula 1# in nebulizer-pipeline coupling continuous reactor, getting corresponding water-soluble azo dye solution, and other conditions are in consistent with the Embodiment 97.

Embodiments 1056-1098

Using solutions of coupling components with the structural formula 57-99# to replace 1-amino-8-hydroxy-3,6-naphthalene disulfonic acid solution to react with p-amino benzene sulfonic acid diazo salt in nebulizer-pipeline coupling continuous reactor, getting corresponding water-soluble azo dye solution, and other conditions are in consistent with the Embodiment 97.

Embodiments 1099-1141

Using solutions of coupling components with the structural formula 57-99# to replace 1-amino-8-hydroxy-3,6-naphthalene disulfonic acid solution to react with p-nitroaniline diazo salt in nebulizer-pipeline coupling continuous reactor, getting corresponding water-soluble azo dye solution, and other conditions are in consistent with the Embodiment 97.

Embodiments 1142-1184

Using solutions of coupling components with the structural formula 57-99# to replace 1-amino-8-hydroxy-3,6-naphthalene disulfonic acid solution to react with aniline diazo salt in nebulizer-pipeline coupling continuous reactor, getting corresponding water-soluble azo dye solution, and other conditions are in consistent with the Embodiment 97.

Embodiment 1185

Preparation of coupling component solution: 6.82 g of 1-amino-8-hydroxy-3,6-naphthalene disulfonic acid was added into 250 mL flask containing 40 mL water, then the sodium carbonate solution with 20% concentration was added under stirring. The resulting mixture was adjusted to a pH6.0-6.5, and diluted with water to a total volume of 200 mL, then the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 10 ml/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 10, the angle between interception column plate and pipe wall is 90°, the pH value of product solution of the reactor outlet is 2-3, getting water-soluble azo dye solution.

Embodiment 1186

Preparation of coupling component solution: 68.2 g of 1-amino-8-hydroxy-3,6-naphthalene disulfonic acid was added into 2500 mL flask containing 400 mL water, then the sodium carbonate solution with 20% concentration was added under stirring. The resulting mixture was adjusted to pH 6.0-6.5, and diluted with water to a total volume of 2000 mL, then the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 50 ml/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 50, the angle between interception column plate and pipe wall is 120°, the pH value of product solution of the reactor outlet is 2-3, getting water-soluble azo dye solution.

Embodiment 1187

Preparation of coupling component solution: 68.2 g of 1-amino-8-hydroxy-3,6-naphthalene disulfonic acid was added into 2500 mL flask containing 800 mL water, then the sodium carbonate solution with 20% concentration was added under stirring. The resulting mixture was adjusted to pH 6.0-6.5, and diluted with water to a total volume of 4000 mL, then the solution was adjusted pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 100 ml/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 70, the angle between interception column plate and pipe wall is 80°, the pH value of product solution of the reactor outlet is 2-3, getting water-soluble azo dye solution.

Embodiment 1188

Preparation of coupling component solution: 682 g of 1-amino-8-hydroxy-3,6-naphthalene disulfonic acid was added into flask containing 1000 mL water, then the sodium carbonate solution with 20% concentration was added under stirring. The resulting mixture was adjusted to pH 6.0-6.5, and diluted with water to a total volume of 20000 mL, then the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 500 ml/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 80, the angle between interception column plate and pipe wall is 60°, the pH value of product solution of the reactor outlet is 2-3, getting water-soluble azo dye solution.

Embodiment 1189

Preparation of coupling component solution: 682 g of 1-amino-8-hydroxy-3,6-naphthalene disulfonic acid was added into flask containing 10 L water, then the sodium carbonate solution with 20% concentration was added under stirring. The resulting mixture was adjusted to pH 6.0-6.5, and diluted with water to a total volume of 20 L, the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 2 L/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 80, the angle between interception column plate and pipe wall is 45°, the pH value of product solution of the reactor outlet is 2-3, getting water-soluble azo dye solution.

Embodiment 1190

Preparation and production of coupling component solution: 682 g of 1-amino-8-hydroxy-3,6-naphthalene disulfonic acid was added into flask containing 100 L water, then the sodium carbonate solution with 20% concentration was added under stirring. The resulting mixture was adjusted to pH 6.0-6.5, and diluted with water to a total volume of 200 L, then the solution was adjusted to PH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 10 L/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 150, the angle between interception column plate and pipe wall is 60°, the pH value of product solution of the reactor outlet is 2-3, getting water-soluble azo dye solution.

Embodiment 1191

Preparation of coupling component solution: 682 g of 1-amino-8-hydroxy-3,6-naphthalene disulfonic acid was added into flask containing 100 L water, then the sodium carbonate solution with 20% concentration was added under stirring. The resulting mixture was adjusted to pH 6.0-6.5, and diluted with water to a total volume of 200 L, then the solution was adjusted to pH 6.0-6.5 to give 1-amino-8-hydroxy-3,6-naphthalene disulfonic acid coupling component solution for further use. The aniline diazo salt solution at the same molar concentration with coupling component solution was prepared for further use.

The flow rate of the aniline diazo salt and coupling component solutions are both 50 L/min by adjusting the calibration constant flow pump, so that the aniline diazo salt and coupling component solutions are separately delivered into the nebulizer-pipeline coupling continuous reactor. The setting angle θ of the nebulizing units of nebulizer (1 and 2) is 90 degrees; the number of interception column plates of pipeline unit (3) of the reactor is 150, the angle between interception column plate and pipe wall is 60°, the pH value of product solution of the reactor outlet is 2-3, getting water-soluble azo dye solution.

The invention claimed is:
1. A method for continuously producing an azo dye solution, comprising:

(a) atomizing a diazo salt solution in a first nebulizing unit to form a plurality of first liquid droplets at room temperature;

(b) atomizing a solution of a coupling agent in a second nebulizing unit to form a plurality of second liquid droplets at room temperature;

(c) coalescing the first liquid droplets with the second liquid droplets in a gas phase defined by a housing to form a liquid stream;

(d) gravity feeding the liquid stream without a carrier gas into a tubular reactor having a plurality of baffles installed therein, wherein the tubular reactor having an inlet that opens to the housing to receive the liquid stream; and (e) obtaining a product stream from the tubular reactor, wherein a majority of the diazo salt and the coupling agent react in the coalescing step and the remaining diazo salt and the coupling agent react in the tubular reactor, and heat generated by reacting the diazo salt and the coupling agent is not removed using a cooling source or a carrier gas, and the azo dye is water soluble.

2. The method of claim 1, wherein a number of the baffles installed in the tubular reactor ranges from 10 to 150, and an angle between a baffle and a wall of the tubular reactor ranges from 0° to 180°.

3. The method of claim 1, wherein the first nebulizer comprises a first nozzle and the second nebulizer comprises a second nozzle, wherein an angle between an axial direction of the first nozzle and an axial direction of the second nozzle ranges from 0° to 180°.

4. The method of claim 1, wherein the coupling agent is an arylamine.

5. The method of claim 4, wherein the solution of the coupling agent has a pH value of 6.0-6.5 and the product stream has a pH value of 2-3.

6. The method of claim 1, wherein the coupling agent comprises methylene or phenolic hydroxyl.

7. The method of claim 6, wherein the solution of the coupling agent has a pH value of 9.5-9.9 and the product stream has a pH value of 7.0-8.0.

8. The method of claim 1, wherein a molar concentration of the diazo salt in the diazo salt solution is the same as a molar concentration of the coupling agent in the solution of the coupling agent.

* * * * *